Dec. 30, 1969  R. L. COLOGNA  3,486,698
ROLL AND DIRECTIONAL CONTROL APPARATUS FOR ROCKET MOTORS
Filed July 13, 1966  2 Sheets-Sheet 1

*INVENTOR.*
RUDY L. COLOGNA
BY Edwin D. Grant

ATTORNEY

Dec. 30, 1969   R. L. COLOGNA   3,486,698
ROLL AND DIRECTIONAL CONTROL APPARATUS FOR ROCKET MOTORS
Filed July 13, 1966   2 Sheets-Sheet 2

INVENTOR.
RUDY L. COLOGNA
BY Edwin D. Grant
ATTORNEY

# United States Patent Office 3,486,698
Patented Dec. 30, 1969

3,486,698
ROLL AND DIRECTIONAL CONTROL APPARATUS
FOR ROCKET MOTORS
Rudy L. Cologna, Santa Monica, Calif., assignor to Thiokol Chemical Corporation, Bristol, Pa., a corporation of Delaware
Filed July 13, 1966, Ser. No. 565,003
Int. Cl. B64c 15/04
U.S. Cl. 239—265.25    6 Claims This invention relates to rocket motors and, more particularly, to means for controlling the roll and flight direction of a rocket motor.

There has been a need for an efficient means for controlling the roll (i.e., rotation about the longitudinal axis) of solid propellant rocket motors having immovable thrust nozzles. As will be explained in further detail hereinafter, the invention satisfies this need by providing rocket roll control apparatus that permits exhaust gas to be bled through a vent in the thrust nozzle of a rocket motor and deflected by a deflector mounted on the outer surface of said thrust nozzle. In a preferred embodiment of the invention, a plurality of vents and deflectors of the type described are spaced about the thrust nozzle of a rocket motor, thus providing an effective means for rotating the rocket motor about its longitudinal axis and also for applying forces transversely against said thrust nozzle to thereby change the flight direction of the rocket motor.

It is accordingly a broad object of this invention to provide an improved means for controlling the roll of a rocket motor about its longitudinal axis.

Another object of this invention is to provide an effective apparatus for controlling both the roll and flight direction of a rocket motor.

Other objects and advantages of this invention will become manifest in the following specification thereof, in which reference is made to the accompanying drawings wherein.

Throughout the specification and drawings, the same reference numbers refer to the same parts.

Figure 1:
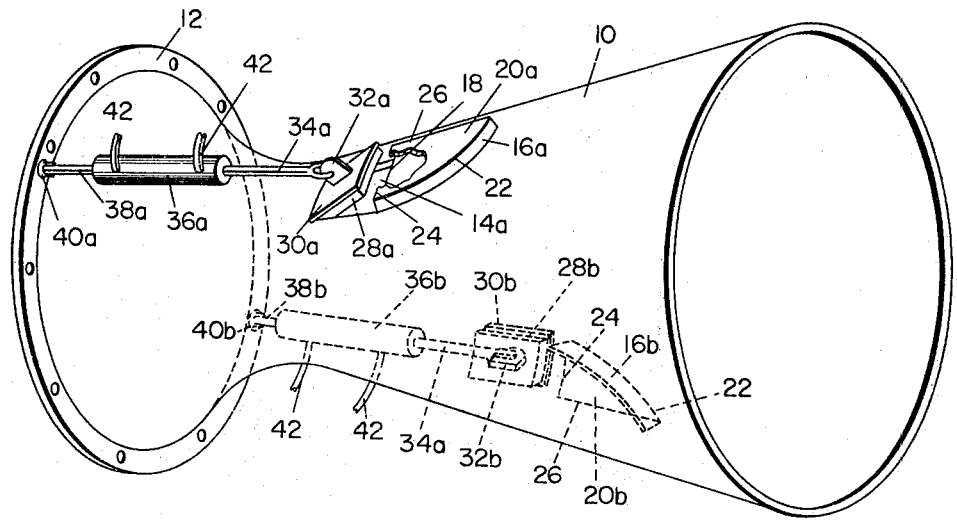
FIGURE 1 is a pictorial view of one embodiment of the invention.

In FIGURE 1 reference number 10 designates a thrust nozzle having integrally formed on the forward end thereof a bolt flange 12 by means of which said thrust nozzle can be secured to the casing of a rocket motor. Preferably the longitudinal axis of thrust nozzle 10 is coincident with the longitudinal axis of the rocket motor casing on which it is mounted. Two apertures 14a, 14b (aperture 14b being outlined by broken lines in the drawing) are formed in the wall of thrust nozzle 10, these apertures being diametrically opposed, equidistant from the throat of said thrust nozzle, and substantially rectangular in shape. Mounted on thrust nozzle 10 aft of each aperture 14a, 14b is a vane or deflector 16a, 16b (deflector 16b being illustrated by broken lines in the drawing). More particularly, each deflector 16a, 16b is fixedly mounted on thrust nozzle 10 by suitable means, such as welding, projects outwardly from the outer surface of said thrust nozzle, and extends from a point adjacent one end of the aft edge 18 of one of the apertures 14a, 14b to a point longitudinally aligned with, and spaced aft of, the other end of said aft edge 18. However, as will be noted in the drawing, deflectors 16a, 16b are inclined in opposite directions relative to thrust nozzle 10. Integrally joined to the outer edge of each deflector 16a, 16b is a guide member 20a, 20b (guide member 20b being illustrated by broken lines in the drawing and a portion of guide member 20a being removed for clarity) which projects substantially perpendicular therefrom toward the adjacent aperture 14a, 14b. More particularly, each guide member 20a, 20b has a first edge 22 that is integrally joined to the outer edge of a respective one of the deflectors 16a, 16b and coextensive therewith, a second edge 24 that is parallel to the aft edge 18 of a respective one of said apertures 14a, 14b and substantially coextensive therewith, and a third edge 26 that is longitudinally aligned with one side edge of a respective one of said apertures 14a, 14b and parallel to the outer surface of thrust nozzle 10.

Disposed within each aperture 14a, 14b is a closure member or door 28a, 28b the forward end of which is pivotally connected to thrust nozzle 10 by means of pivot pins (not shown) that project from the side edges of said door into holes formed in the side edges of said aperture. Thus each door 28a, 28b is mounted on thrust nozzle 10 for movement between a first position thereof wherein the side and aft edges of the outer portion 30a, 30b of said door abut the outer surface of said thrust nozzle adjacent the side and aft edges of the aperture 14a, 14b in which said door is positioned, and a second position thereof wherein the aft portion of said door is raised as illustrated in FIGURE 1 and said aperture is opened. Each door 28a, 28b is provided with an integral, outwardly projecting lug 32a, 32b to which is pivotally connected the free end of the drive shaft 34a, 34b of a hydraulic cylinder 36a, 36b, said cylinder being itself pivotally mounted on thrust nozzle 10 by means of a support arm 38a, 38b and bracket 40a, 40b. Conduits 42 connect each of the hydraulic cylinders 36a, 36b to conventional means (not shown) for actuating said cylinders from a remote point on the rocket motor casing on which thrust nozzle 10 is mounted.

The above-described components of the embodiment of the invention illustrated in FIGURE 1 can be made of suitable materials, for example, tungsten or molybdenum alloys in the case of components that are exposed to the high-temperature exhaust gas discharged through thrust nozzle 10 during the operation of the rocket motor of which it is a part.

During the operation of the rocket motor on which thrust nozzle 10 is mounted, hydraulic cylinders 36a, 36b can be simultaneously actuated to move doors 28a, 28b to the aforedescribed second position thereof that is illustrated in FIGURE 1. Thereafter a portion of the gas being discharged through thrust nozzle 10 passes through apertures 14a, 14b and strikes deflectors 16a, 16b (guide members 20a, 20b directing said gas toward said deflectors), thereby applying forces transversely against thrust nozzle 10 and causing it and the rocket motor casing on which it is mounted to rotate about the longitudinal axis thereof. Hydraulic cylinders 36a, 36b can also be actuated to move doors 28a, 28b to the aforedescribed first position thereof wherein apertures 14a, 14b are closed thereby, at which time the flow of gas against deflectors 16a, 16b will, of course, be ended.

Figure 2:
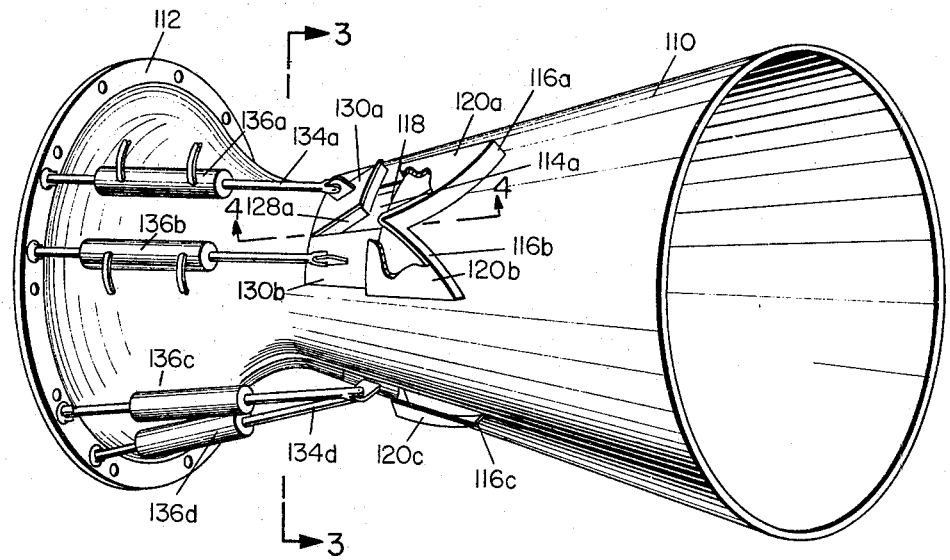
FIGURE 2 is a pictorial view of a second, preferred embodiment of the invention.
Figure 3:
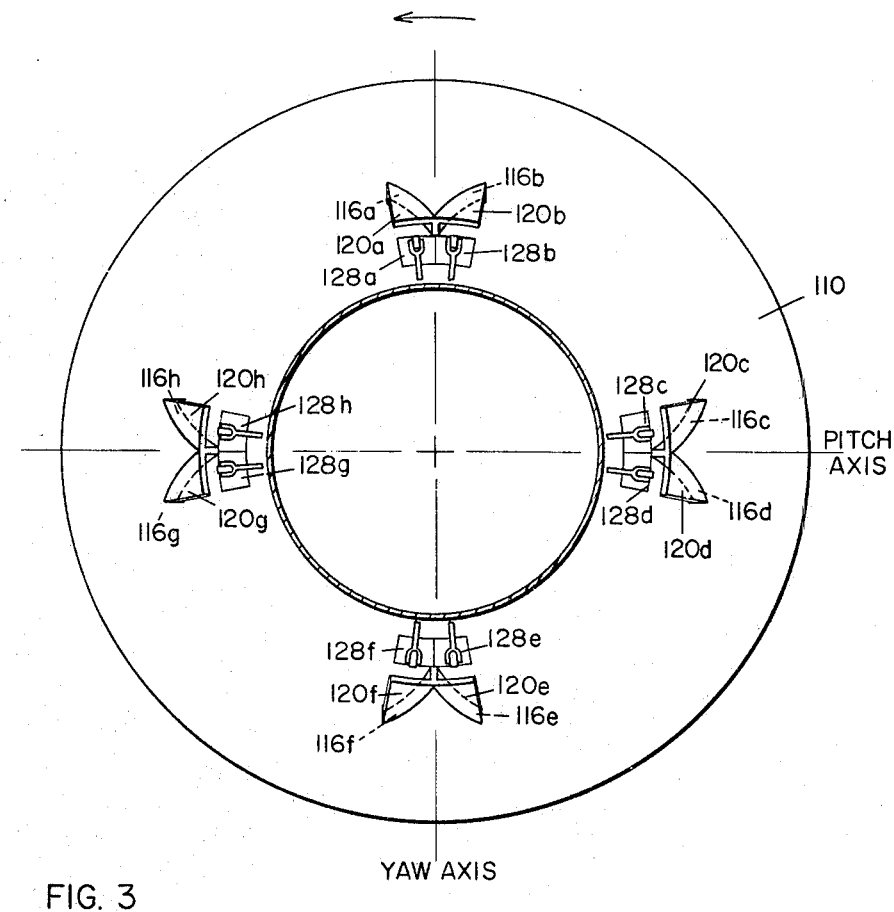
FIGURE 3 is a cross-sectional view of said preferred embodiment, taken along the plane represented by line 3—3 of FIGURE 2 in the indicated direction.
Figure 4:
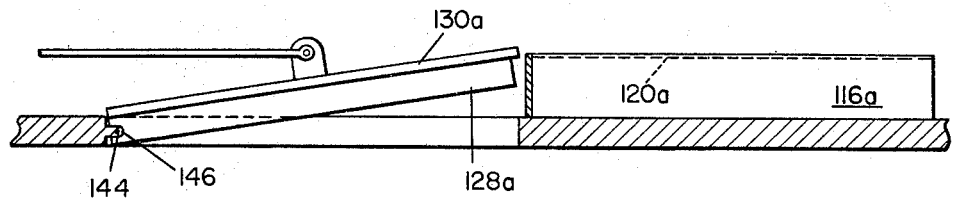
FIGURE 4 is a detail view of components of said preferred embodiment, taken along the plane represented by line 4—4 of FIGURE 2 in the indicated direction.

In FIGURES 2, 3, and 4 is illustrated a second, preferred embodiment of the invention having components which are substantially the same as those illustrated in FIGURE 1, the major difference between the first and second embodiments being that the deflectors of the latter are spaced in pairs about the periphery of a thrust nozzle. More particularly, the thrust nozzle 110 of the preferred embodiment of the invention is provided with an integral bolt flange 112 at its forward end and has four rectangular apertures 114a through 114d (only aperture 114a being illustrated in the drawings) evenly spaced about the wall thereof, these apertures being equidistant from the throat of said thrust nozzle. In FIGURE 2 can be seen three of eight deflectors 116a through 116h which are spaced in pairs about the periphery of thrust nozzle 110 and fixedly mounted thereon. For convenience, adjacent deflectors are formed of a single piece of metal bent in the form of a V. Each deflector 116a through 116h extends from a point adjacent the middle of the aft edge 118 of a respective one of the apertures 114a through 114d to a point longitudinally aligned with, and spaced aft of, one end of said aft edge 118. Thus adjacent deflectors are inclined in opposite directions relative to thrust nozzle 110.

Integrally joined to the outer edge of each deflector 116a through 116h is a guide member 120a through 120h (a portion of guide members 120a, 120b being removed for clarity in FIGURE 2) which projects substantially perpendicular therefrom toward the adjacent aperture 114a through 114d. Disposed side by side within each aperture 114a through 114d are two closure members or doors 128a through 128h. The forward end of each door is pivotally connected to thrust nozzle 110 by means of a first pivot pin (not shown) that projects from one side edge of said door into a hole formed in the side edge of the aperture in which said door is positioned, and a second pivot pin 144 (see FIGURE 4) that projects from the other side edge of said door into a hole formed in a support lug 146 integrally joined to thrust nozzle 110 and positioned in the middle of the forward edge of the same aperture. Thus each door 128a through 128h is mounted on thrust nozzle 110 for movement between a first position thereof wherein one side edge and the aft edge of the outer portion 130a through 130h thereof abut the outer surface of said thrust nozzle adjacent one side edge and the aft edge of the aperture 114a through 114h in which said door is positioned, and a second position thereof wherein the aft portion of said door is raised as illustrated in FIGURE 2 in the case of door 130a. A hydraulic cylinder 136a through 136h is provided to open and close each door 128a through 128h.

It will be recognized by inspection of FIGURE 3 that doors 128a through 128h can be selectively opened, during the operation of the rocket motor on which thrust nozzle 110 is mounted, to control both the roll of said rocket motor about its longitudinal axis and its flight direction. For example, if roll in the direction of the arrow in FIGURE 3 is required, doors 128b, 128d, 128f and 128h (the outer portions 130 of the doors being seen in said drawing) are opened to effect such rotation. Likewise, if roll in the opposite direction is desired, doors 128a, 128c, 128e and 128g are opened. Furthermore, to effect pitch and yaw control of the rocket motor on which thrust nozzle 110 is mounted, selected pairs of the doors are opened. Thus, if the rocket motor is to be turned to the left, doors 128c and 128d are opened; and doors 128g and 128h are opened if flight in the opposite direction is required. Likewise, pitch of the rocket motor is controlled by selectively opening either doors 128a and 128b or doors 128e and 128f. A particular advantage of the preferred embodiment of the invention is that directional control of a rocket motor having an immovable thrust nozzle can be accomplished therewith. Furthermore, the preferred embodiment of the invention provides a rocket motor directional control apparatus that is lighter than conventional thrust vector control systems of the so-called secondary injection type, wherein fluid must be carried by a rocket for injection laterally into the thrust nozzle thereof.

Obviously many modifications and variations of the present invention are possible in the light of the above teachings, and it is therefore to be understood that, within the scope of the appended claims, the invention may be practiced otherwise than specifically described.

What is claimed is:
1. In a rocket motor, the combination comprising:
   a thrust nozzle mounted on the casing of said rocket motor and having at least one aperture formed in the wall thereof;
   a deflector fixedly mounted on said thrust nozzle so as to project outwardly from the outer surface thereof and extending from a point adjacent one end of the aft edge of said aperture toward a point substantially longitudinally aligned with, and spaced aft of, the other end of said aft edge of said aperture;
   a closure member mounted on said thrust nozzle for movement between first and second positions thereof wherein said aperture is respectively closed and opened; and
   means connected to said closure member for moving it between said first and second positions thereof, whereby gas discharged through said thrust nozzle can be selectively permitted to pass through said aperture and strike said deflector to thereby apply force transversely against said thrust nozzle.

2. The combination of claim 1 including a guide member fixedly joined to the outer edge of said deflector and projecting substantially perpendicular therefrom toward said aperture, said gas passing through said aperture being directed by said guide member toward said deflector.

3. The combination of claim 1 wherein said closure member is a door the forward end of which is pivotally connected to said thrust nozzle at the forward end of said aperture.

4. In a rocket motor, the combination comprising:
   a thrust nozzle mounted on the casing of said rocket motor and having at least one aperture formed in the wall thereof;
   a pair of deflectors each fixedly mounted on said thrust nozzle so as to project outwardly from the outer surface thereof and each extending from a point adjacent the middle of the aft edge of said aperture toward a point longitudinally aligned with, and spaced aft of a respective one of the ends of said aft edge of said aperture;
   a pair of closure members each mounted on said thrust nozzle for movement between first and second positions thereof wherein one-half of said aperture is respectively closed and opened; and
   means connected to each of said closure members for moving it between said first and second positions thereof, whereby gas discharged through said thrust nozzle can be selectively permitted to pass through said aperture and strike one of said deflectors to thereby apply force transversely against said thrust nozzle.

5. The combination of claim 4 including a guide member fixedly joined to the outer edge of each of said deflectors and projecting substantially perpendicular therefrom toward said aperture, said gas passing through said aperture being directed by said guide member toward the deflector to which it is joined.

6. The combination of claim 4 wherein each of said closure members is a door the forward end of which is pivotally connected to said thrust nozzle at the forward end of said aperture.

References Cited
UNITED STATES PATENTS 3,094,072   6/1963   Parilla _____ 102—3.2

EVERETT W. KIRBY, Primary Examiner

U.S. Cl. X.R.

60—228; 102—3.2; 239—265.33; 244—52